(12) United States Patent
Nunome et al.

(10) Patent No.: US 8,790,806 B2
(45) Date of Patent: Jul. 29, 2014

(54) ALKALINE BATTERY

(75) Inventors: Jun Nunome, Kyoto (JP); Fumio Kato, Osaka (JP); Fumiharu Sakashita, Osaka (JP); Isamu Saruwatari, Osaka (JP)

(73) Assignee: Panasonic Corporation, Osaka (JP)

( * ) Notice: Subject to any disclaimer, the term of this patent is extended or adjusted under 35 U.S.C. 154(b) by 2 days.

(21) Appl. No.: 13/703,538

(22) PCT Filed: Apr. 3, 2012

(86) PCT No.: PCT/JP2012/002308
§ 371 (c)(1),
(2), (4) Date: Dec. 11, 2012

(87) PCT Pub. No.: WO2013/008366
PCT Pub. Date: Jan. 17, 2013

(65) Prior Publication Data
US 2013/0209842 A1    Aug. 15, 2013

(30) Foreign Application Priority Data
Jul. 14, 2011    (JP) ................. 2011-155333

(51) Int. Cl.
*H01M 2/12*    (2006.01)
*H01M 2/02*    (2006.01)

(52) U.S. Cl.
USPC ............................. 429/82; 429/163; 429/164

(58) Field of Classification Search
None
See application file for complete search history.

(56) References Cited

U.S. PATENT DOCUMENTS 6,284,403 B1 *    9/2001    Tsurutani et al. .............. 429/53

FOREIGN PATENT DOCUMENTS

| JP | 40 026666 | Y2 | 9/1940 |
|----|-----------|----|--------|
| JP | 43-024403 | Y2 | 10/1943 |
| JP | 46-006664 | Y2 | 3/1971 |
| JP | 61-232558 | A | 10/1986 |
| JP | 02 117063 | A | 5/1990 |
| JP | 05-159765 | A | 6/1993 |
| JP | 09-330689 | A | 12/1997 |
| JP | 10-302746 | A | 11/1998 |
| JP | 2001-118557 | A | 4/2001 |
| JP | 2010-061972 | A | 3/2010 |

OTHER PUBLICATIONS

International Search Report mailed Jul. 10, 2012 issued in corresponding International Application No. PCT/JP2012/002308.

* cited by examiner

*Primary Examiner* — Cynthia K. Walls
(74) *Attorney, Agent, or Firm* — McDermott Will & Emery LLP

(57) ABSTRACT

In an alkaline battery in which an opening of a battery case 1 containing a power-generating element is sealed via a sealing plate 7 with a gasket 5 interposed between the battery case 1 and the sealing plate 7, the sealing plate 7 has a vent 7a, the gasket 5 has an explosion-proof valve 5a, an electrolyte filter 9 made of a porous membrane is disposed in a space defined by the sealing plate 7 and the gasket 5, a volume of a space defined by the sealing plate 7 and the electrolyte filter 9 is greater than or equal to 0.25 cm$^3$, and a tensile stress of the electrolyte filter 9 at 100% tensile elongation in at least one direction is in a range of 60-4000 N/m.

8 Claims, 1 Drawing Sheet

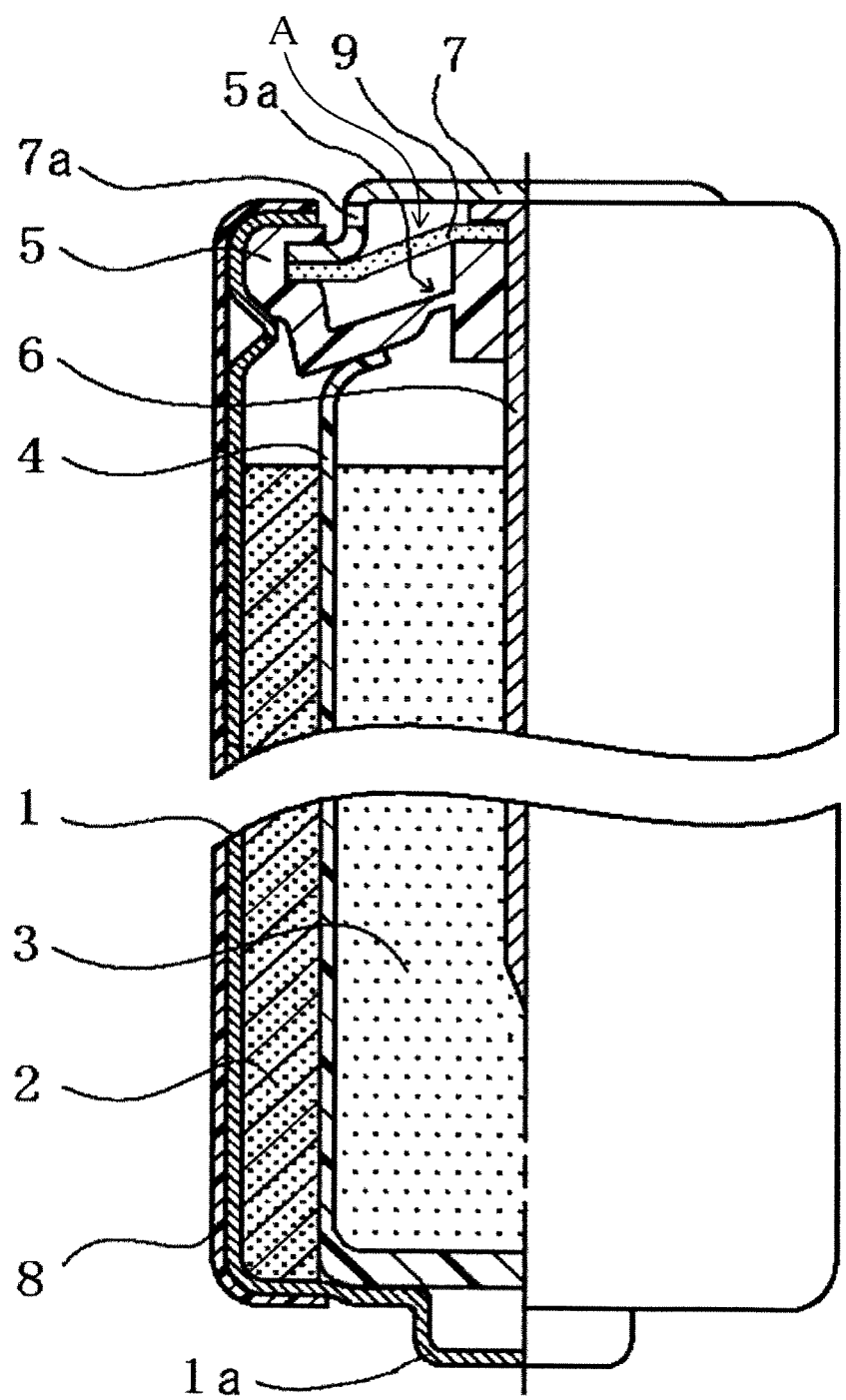

ALKALINE BATTERY

RELATED APPLICATIONS

This application is the U.S. National Phase under 35 U.S.C. §371 of International Application No. PCT/JP2012/002308, filed on Apr. 3, 2012, which in turn claims the benefit of Japanese Application No. 2011-155333, filed on Jul. 14, 2011, the disclosures of which Applications are incorporated by reference herein.

TECHNICAL FIELD

The present invention relates to alkaline batteries including an explosion-proof valve.

BACKGROUND ART

When a sealed alkaline battery is accidentally charged or overdischarged, gas may be generated in the battery, and the internal pressure of the battery may increase, resulting in a rupture of the battery. To address this problem, alkaline batteries generally include an explosion-proof valve configured to release gas generated in each of the batteries to outside the battery with an increase in the internal pressure of the battery.

A structure in which a gasket used to seal an opening of a battery case includes a thin portion, and the thin portion of the gasket is ruptured with an increase in the internal pressure of the battery to release gas generated in the battery to outside the battery has been known as the structure of the explosion-proof valve.

Incidentally, actuation of an explosion-proof valve does not only allow the release of gas generated in a battery to outside the battery, but also may simultaneously cause an electrolyte to leak or be scattered to outside the battery. An electrolyte of an alkaline battery is strongly alkaline, and thus, electrolyte leakage may cause problems, such as corrosion of a used device.

To address such problems, PATENT DOCUMENT 1 describes a technique in which in a sealed alkaline battery, a gas-permeable shielding filter is disposed inside a sealing plate to reduce the scattering of an electrolyte.

PATENT DOCUMENT 2 describes a technique in which an air-permeable and liquid impervious porous member is disposed in a space defined by a gasket and a sealing plate to prevent electrolyte leakage.

CITATION LIST

Patent Document

PATENT DOCUMENT 1: Japanese Patent Publication No. 2001-118557
PATENT DOCUMENT 2: Japanese Patent Publication No. 2010-61972

SUMMARY OF THE INVENTION

Technical Problem

The shielding filter described in PATENT DOCUMENT 1, or the porous member described in PATENT DOCUMENT 2 is effective at reducing the scattering or leakage of an electrolyte; however, with actuation of an explosion-proof valve, the shielding filter or the porous member may be ruptured under the pressure of suddenly released gas. Alternatively, even when the shielding filter or the porous member is not ruptured, a mixture of gas and an electrolyte passes through pores of the shielding filter or the porous member at high pressures, and thus, the mixture may be released in the form of mist to outside the battery.

The present invention has been achieved in view of the foregoing point, and a principal object of the present invention is to provide an alkaline battery which, with actuation of an explosion-proof valve, does not cause electrolyte leakage to outside the battery.

Solution to the Problem

An alkaline battery according to the present invention is directed to an alkaline battery in which an opening of a battery case containing a power-generating element is sealed via a sealing plate with a gasket interposed between the battery case and the sealing plate. The sealing plate has a vent, the gasket has an explosion-proof valve, an electrolyte filter made of a porous membrane is disposed in a space defined by the sealing plate and the gasket, a volume of a space defined by the sealing plate and the electrolyte filter is greater than or equal to 0.25 cm$^3$, and a tensile stress of the electrolyte filter at 100% tensile elongation in at least one direction is in a range of 60-4000 N/m.

Advantages of the Invention

According to the present invention, an alkaline battery which, with actuation of an explosion-proof valve, does not cause electrolyte leakage to outside the battery can be provided.

BRIEF DESCRIPTION OF THE DRAWINGS

FIG. 1 is a partial cross-sectional view illustrating the structure of an alkaline battery according to an embodiment of the present invention.

DESCRIPTION OF EMBODIMENT

An embodiment of the present invention will be described hereinafter with reference to the drawings. The present invention is not limited to the following embodiment. Various modifications can be made to the embodiment without deviating from the scope of the present invention. The embodiment can be combined with other embodiments.

FIG. 1 is a partial cross-sectional view schematically illustrating the structure of an alkaline battery according to the embodiment of the present invention. As illustrated in FIG. 1, a cylindrical battery case 1 having a closed end contains a positive electrode 2, a negative electrode 3, a separator 4 interposed between the electrodes 2 and 3, and an electrolyte. An opening of the battery case 1 is sealed via a sealing unit integrally including a sealing plate 7, a negative electrode current collector 6, a gasket 5, and an electrolyte filter 9. The outer surface of the battery case 1 is coated with an exterior label 8. In this embodiment, the battery case 1 also serves as a positive electrode terminal 1a, and the sealing plate 7 also serves as a negative electrode terminal.

An explosion-proof valve of this embodiment includes a thin portion 5a of the ring-shaped gasket 5, and a vent 7a formed in the sealing plate 7. An electrolyte filter 9 made of a porous membrane is disposed between the gasket 5 and the sealing plate 7. When the pressure of gas generated in the battery reaches a predetermined value, the thin portion 5a is ruptured, and the gas in the battery is released through the electrolyte filter 9 and the vent 7a to outside the battery.

The electrolyte filter 9 prevents the passage of the electrolyte therethrough, and allows the passage of only gas therethrough, and thus, with actuation of the explosion-proof valve, the electrolyte does not leak to outside the battery. The reason why the electrolyte filter 9 acts as above is that while pores of the porous membrane forming the electrolyte filter 9 prevent the passage of liquid, such as an electrolyte, therethrough by using surface tension, gas easily passes through the pores.

Table 1 is a table illustrating the results of the inventors' study on the leakage of an electrolyte in a situation where an electrolyte filter 9 made of a porous membrane is disposed between a gasket 5 and a sealing plate 7. Fabricated batteries 1-3 were AA alkaline batteries each having such a structure as illustrated in FIG. 1, and as the porous membrane, a porous membrane (having a tensile stress of 60 N/m at 100% tensile elongation) made of polytetrafluoroethylene was used.

TABLE 1

| BATTERY No. | CONFIGURATION OF SEALING UNIT VOLUME OF SPACE A (cm³) | CHECK RESULTS 33° C. 85RH % AFTER 5 DAYS ELECTROLYTE LEAKAGE PERCENTAGE (%) |
|---|---|---|
| BATTERY 1 | — | 100 |
| BATTERY 2 | 0 | 80 |
| BATTERY 3 | 0.25 | 0 |

Here, among the fabricated batteries 1-3, the battery 1 is a battery which does not include an electrolyte filter 9, the battery 2 is a battery in which an electrolyte filter 9 is in contact with the inner surface of a sealing plate 7 to block a vent 7a of the sealing plate 7, and the battery 3 is a battery in which as illustrated in FIG. 1, a fixed space A (having a volume of 0.25 cm³) is provided between a sealing plate 7 and an electrolyte filter 9.

To check whether the batteries cause electrolyte leakage or not, the fabricated batteries 1-3 were overdischarged in an environment of room temperature (20° C.) at a constant voltage of −3.4 V for 20 hours, the fabricated batteries 1-3, 10 each, were then stored for five days in an environment of 33° C. and a relative humidity of 85% (85RH %) in an open circuit state, and the percentage of batteries causing electrolyte leakage (electrolyte leakage percentage %) was determined. A negative electrode of such an overdischarged battery generates a larger amount of hydrogen gas than that of a battery used in a normal manner.

Assuming that the vent 7a of the sealing plate 7 does not exist, the volume of the space A defined by the sealing plate 7 and the electrolyte filter 9 was calculated.

As illustrated in Table 1, the ten batteries 1 which do not include the electrolyte filter 9 cause electrolyte leakage (electrolyte leakage percentage: 100%). Although the electrolyte leakage percentage in the batteries 2 including an electrolyte filter 9 was slightly lower than that in the batteries 1, it was a still high electrolyte leakage percentage, i.e., 80%. In contrast, the electrolyte leakage percentage in the batteries 3 in each of which the fixed space A is provided between the sealing plate 7 and the electrolyte filter 9 was 0%.

The reason why, as above, the electrolyte leakage percentage widely varies depending on the location at which the electrolyte filter 9 is disposed is as follows.

Usually, in a cylindrical alkaline battery, the volume of a space defined by a gasket 5 having a thin portion 5a and an electrolyte filter 9 is very small, i.e., 1/10 or less of the internal volume of the battery. Thus, immediately after actuation of an explosion-proof valve (thin portion 5a), a slightly lower pressure than the pressure at which the explosion-proof valve is actuated (usually about 7 MPa) is applied to the electrolyte filter 9.

The batteries 2 in each of which the electrolyte filter 9 is in contact with the inner surface of the sealing plate 7 each do not include a fixed space A between the sealing plate 7 and the electrolyte filter 9. Thus, when a high pressure was applied to the electrolyte filter 9, a portion of the electrolyte filter 9 entered the vent 7a so as to be ruptured, resulting in electrolyte leakage.

In contrast, in the battery 3 in which the fixed space A is provided between the sealing plate 7 and the electrolyte filter 9, even when a high pressure was applied to the electrolyte filter 9, the electrolyte filter 9 inflates toward the space A, and thus, was not ruptured, resulting in no electrolyte leakage.

Specifically, the fixed space A is provided between the sealing plate 7 and the electrolyte filter 9, and thus, when the explosion-proof valve (thin portion 5a) is actuated, the space A can be utilized as a buffer space toward which the electrolyte filter 9 is inflated under pressure. Thus, even when a high pressure is applied to the electrolyte filter 9, the electrolyte filter 9 inflates toward the space A to prevent a rupture of the electrolyte filter 9, thereby preventing an electrolyte from leaking to outside the battery.

In view of the foregoing, when the explosion-proof valve is actuated, the volume of the space A defined by the sealing plate 7 and the electrolyte filter 9 needs to be set in a fixed range to prevent a rupture of the electrolyte filter 9.

Table 2 is a table illustrating results obtained by fabricating batteries 4-9 which each include a space A defined by a sealing plate 7 and an electrolyte filter 9, and which have the spaces A having different volumes, and checking whether the batteries 4-9 cause the electrolyte leakage or not. Here, the same porous membrane as the porous membrane (having a tensile stress of 60 N/m at 100% tensile elongation) for use in each of the batteries 1-3 illustrated in Table 1 was used as a material of the electrolyte filter 9. Whether the batteries cause electrolyte leakage or not was checked in the same method as that in Table 1. Table 2 also illustrates the electrolyte leakage percentages in the batteries 4-9 in a situation where the batteries 4-9 were stored in an environment of 45° C. and a relative humidity of 90% (90RH %) for five days. The batteries 4 and 6 in Table 2 are identical with the batteries 2 and 3, respectively, in Table 1.

TABLE 2

| BATTERY No. | CONFIGURATION OF SEALING UNIT VOLUME OF SPACE A (cm³) | CHECK RESULTS 33° C. 85RH % AFTER 5 DAYS ELECTROLYTE LEAKAGE PERCENTAGE (%) | 45° C. 90RH % AFTER 5 DAYS ELECTROLYTE LEAKAGE PERCENTAGE (%) |
|---|---|---|---|
| BATTERY 4 | 0 | 80 | 100 |
| BATTERY 5 | 0.12 | 60 | 90 |
| BATTERY 6 | 0.25 | 0 | 0 |
| BATTERY 7 | 0.36 | 0 | 0 |
| BATTERY 8 | 0.50 | 0 | 0 |
| BATTERY 9 | 0.90 | 0 | 0 |

As illustrated in Table 2, while an electrolyte leaked from the batteries 4 and 5 in each of which the volume of the space A defined by the sealing plate 7 and the electrolyte filter 9 was equal to or less than 0.12 cm³, an electrolyte did not leak from the batteries 6-9 in each of which the volume of the space A defined by the sealing plate 7 and the electrolyte filter 9 was greater than or equal to 0.25 cm$^3$.

The reason for this is as follows: when the volume of the space A defined by the sealing plate 7 and the electrolyte filter 9 was equal to or less than 0.12 cm$^3$, the electrolyte filter 9 inflated with the sudden release of gas from the interior of the battery to occupy substantially the entire space A, and was not able to further inflate; thus, the electrolyte filter 9 entered the vent 7a, and a hole was formed in the electrolyte filter 9, resulting in electrolyte leakage.

In contrast, when the volume of the space A defined by the sealing plate 7 and the electrolyte filter 9 was greater than or equal to 0.25 cm$^3$, the gas suddenly released from the interior of the battery was able to be once received by the extended electrolyte filter 9, and thus, the electrolyte filter 9 was not ruptured, resulting in no electrolyte leakage.

When the volume of the space A defined by the sealing plate 7 and the electrolyte filter 9 is greater than necessary, this causes a reduction in the energy density of the battery, and thus, is not practically preferable. Thus, the volume of the space A defined by the sealing plate 7 and the electrolyte filter 9 is preferably in a range of 0.25-0.36 cm$^3$.

As described above, the space A defined by the sealing plate 7 and the electrolyte filter 9 is utilized as a buffer space toward which the electrolyte filter 9 inflates under pressure. To utilize the space A thereas, the electrolyte filter 9 needs to have a given tensile elongation and a given tensile stress which prevent the electrolyte filter 9 from being ruptured even with inflation of the electrolyte filter 9 under a predetermined pressure.

Table 3 is a table illustrating results obtained by fabricating batteries 10-15 in each of which the volume of a space A defined by a sealing plate 7 and an electrolyte filter 9 is fixed (0.25 cm$^3$), and which have the electrolyte filters 9 having different tensile stresses, and checking whether the batteries 10-15 cause electrolyte leakage or not. Here, the same material (polytetrafluoroethylene) as that of the porous membrane for use in each of the batteries 1-3 illustrated in Table 1 was used as a material of the electrolyte filter 9. The magnitude of the tensile stress was varied by adjusting the degree of extension of the porous membrane in the stage in which the electrolyte filter 9 is fabricated by extending the porous membrane. The tensile stress corresponds to the magnitude of the tensile stress at 100% tensile elongation in a tensile strength test in any one of the directions parallel to the plane of the electrolyte filter, and the stress in any one of the directions may be in a range of 60-1000 N/m. The reason for this is that when the electrolyte filter is to extend by applying a pressure to the electrolyte filter, the electrolyte filter preferentially extends in the direction in which it easily extends, and thus, an advantage is provided as long as the strength of the electrolyte filter in any one of the directions falls within an appropriate range. Whether the batteries cause the electrolyte leakage or not was checked in the same method as that in Table 2. The battery 11 in Table 3 is identical with the battery 6 in Table 2.

TABLE 3

| | CONFIGURATION OF SEALING UNIT | | CHECK RESULTS | |
| --- | --- | --- | --- | --- |
| | | | 33° C. 85RH % AFTER 5 DAYS | 45° C. 90RH % AFTER 5 DAYS |
| BATTERY No. | VOLUME OF SPACE A (cm$^3$) | TENSILE STRENGTH OF ELECTROLYTE FILTER (N/m) | ELECTROLYTE LEAKAGE PERCENTAGE (%) | ELECTROLYTE LEAKAGE PERCENTAGE (%) |
| BATTERY 10 | 0.25 | 30 | 40 | 70 |
| BATTERY 11 | 0.25 | 60 | 0 | 0 |
| BATTERY 12 | 0.25 | 300 | 0 | 0 |
| BATTERY 13 | 0.25 | 1000 | 0 | 0 |
| BATTERY 14 | 0.25 | 4000 | 0 | 10 |
| BATTERY 15 | 0.25 | 5000 | 30 | 70 |

As illustrated in Table 3, while an electrolyte leaked from the battery 10 including the electrolyte filter with a tensile stress of 30 N/m, and the battery 15 including the electrolyte filter with a tensile stress of 5000 N/m, an electrolyte did not leak from the batteries 11-14 each including the electrolyte filter with a tensile stress in a range of 60-4000 N/m.

The reason for this is as follows. In the battery 10 including the electrolyte filter with a tensile stress of 30 N/m, the strength of the electrolyte filter 9 itself was insufficient, and thus, when the explosion-proof valve was actuated, the electrolyte filter 9 was ruptured due to the pressure of suddenly released gas, resulting in electrolyte leakage. In contrast, in the batteries 11-14 each including the electrolyte filter with a tensile stress in a range of 60-4000 N/m, even when a high pressure was applied to the electrolyte filter 9, the electrolyte filter 9 extended so as to be inflated toward the space A, and thus, was not ruptured, resulting in no electrolyte leakage. In the battery 15 including the electrolyte filter with a tensile stress of 5000 N/m, the electrolyte filter 9 was ruptured while being inflated toward the space A, resulting in electrolyte leakage.

As illustrated in Table 3, when whether the battery 14 including the electrolyte filter with a tensile stress of 4000 N/m causes the electrolyte leakage or not was checked in an environment of a higher temperature and humidity (45° C., 90RH %), a small amount of an electrolyte leaked. The reason for this is that although the electrolyte filter 9 was not ruptured, a large amount of water vapor outside the battery gradually entered the interior of the battery over a long time period, and thus, the electrolyte overflowed the internal space of the cell, resulting in electrolyte leakage.

In view of the above check results, in an alkaline battery in which an electrolyte filter 9 made of a porous membrane is disposed in a space defined by a sealing plate 7 and a gasket 5, a space A defined by the sealing plate 7 and the electrolyte filter 9 has a volume greater than or equal to 0.25 cm$^3$, and the tensile stress of the electrolyte filter 9 at 100% tensile elongation in at least one direction is in a range of 60-4000 N/m, thereby preventing an electrolyte from leaking to outside the battery with actuation of the explosion-proof valve (thin portion 5a). In view of the energy density of the battery, the volume of the space A defined by the sealing plate 7 and the electrolyte filter 9 is preferably equal to or less than 0.36 cm$^3$.

Furthermore, in order to prevent electrolyte leakage in an environment of high temperature and high humidity, the tensile stress of the electrolyte filter 9 at 100% tensile elongation in at least one direction is preferably in a range of 60-1000 N/m.

The tensile stress in the present invention denotes the tensile stress of the electrolyte filter 9 at 100% tensile elongation in at least one direction parallel to the plane of the electrolyte filter 9. The reason for this is that when the electrolyte filter 9 inflates toward the space A, the electrolyte filter 9 extends in a direction parallel to its plane.

In view of the fact that prevention of electrolyte leakage depends on inflation of the electrolyte filter 9 toward the space A, as long as the volume of the space A is greater than or equal to a predetermined volume (0.25 cm$^3$), the preferable range of the tensile stress of the electrolyte filter 9 hardly varies.

Table 4 is a table illustrating results obtained by fabricating batteries 16-21 in each of which the volume of a space A defined by a sealing plate 7 and an electrolyte filter 9 is 0.36 cm$^3$, and which have the electrolyte filters 9 having different tensile stresses, and checking whether the batteries 16-21 cause electrolyte leakage or not. Here, the batteries 16-21 were fabricated under the same conditions as those of the batteries 10-15 illustrated in Table 3 except the volume of the space A.

TABLE 4

| | CONFIGURATION OF SEALING UNIT | | CHECK RESULTS | |
| --- | --- | --- | --- | --- |
| | | | 33° C. 85RH % AFTER 5 DAYS | 45° C. 90RH % AFTER 5 DAYS |
| BATTERY No. | VOLUME OF SPACE A (cm$^3$) | TENSILE STRENGTH OF ELECTROLYTE FILTER (N/m) | ELECTROLYTE LEAKAGE PERCENTAGE (%) | ELECTROLYTE LEAKAGE PERCENTAGE (%) |
| BATTERY 16 | 0.36 | 30 | 40 | 70 |
| BATTERY 17 | 0.36 | 60 | 0 | 0 |
| BATTERY 18 | 0.36 | 300 | 0 | 0 |
| BATTERY 19 | 0.36 | 1000 | 0 | 0 |
| BATTERY 20 | 0.36 | 4000 | 0 | 20 |
| BATTERY 21 | 0.36 | 5000 | 30 | 100 |

As illustrated in Table 4, even when the volume of the space A defined by the sealing plate 7 and the electrolyte filter 9 was changed, results similar to those in Table 3 were obtained.

Table 5 is a table illustrating results obtained by fabricating batteries 22-29 in each of which the volume of a space A defined by a sealing plate 7 and an electrolyte filter 9 is fixed (0.36 cm$^3$), and which have the electrolyte filters 9 made of different materials, and checking whether the batteries 22-29 cause electrolyte leakage or not. Two types of batteries having an electrolyte filter 9 made of each of the materials were prepared; the electrolyte filter 9 of the battery of one of the two types has a tensile stress of 1500 N/m in at least one direction, and the electrolyte filter 9 of the battery of the other type has a tensile stress of 2000 N/m in at least one direction. Here, the batteries 22-29 were fabricated under the same conditions as those of the batteries 10-15 illustrated in Table 3 except the material of the electrolyte filter 9.

TABLE 5

| | CONFIGURATION OF SEALING UNIT | | CHECK RESULTS | |
| --- | --- | --- | --- | --- |
| | | | 33° C. 85RH % AFTER 5 DAYS | 45° C. 90RH % AFTER 5 DAYS |
| BATTERY No. | MATERIAL OF ELECTROLYTE FILTER | TENSILE STRENGTH OF ELECTROLYTE FILTER (N/m) | ELECTROLYTE LEAKAGE PERCENTAGE (%) | ELECTROLYTE LEAKAGE PERCENTAGE (%) |
| BATTERY 22 | PTFE | 1500 | 0 | 0 |
| BATTERY 23 | PTFE | 3000 | 0 | 10 |
| BATTERY 24 | POLYURETHANE | 1500 | 0 | 20 |
| BATTERY 25 | POLYURETHANE | 3000 | 0 | 30 |
| BATTERY 26 | POLYETHYLENE | 1500 | 0 | 30 |
| BATTERY 27 | POLYETHYLENE | 3000 | 0 | 40 |
| BATTERY 28 | POLYPROPYLENE | 1500 | 0 | 30 |
| BATTERY 29 | POLYPROPYLENE | 3000 | 0 | 40 |

As illustrated in Table 5, when whether the batteries cause the electrolyte leakage or not was checked in an environment of 33° C. and 85RH %, the electrolyte did not leak from any battery having an electrolyte filter 9 made of each of the used materials (polytetrafluoroethylene (PTFE), polyurethane, polyethylene, and polypropylene). However, when whether the batteries cause the electrolyte leakage or not was checked in an environment of 45° C. and 90RH %, PTFE was superior to the other materials (polyurethane, polyethylene, and polypropylene). The reason for this is that while the electrolyte filter 9 made of PTFE completely prevents penetration of an electrolyte therethrough, a small amount of an electrolyte penetrates through the electrolyte filters 9 made of the other materials for a long time.

Incidentally, since gas passes through an electrolyte filter 9, a battery having lost hermeticity is exposed to outside air after actuation of an explosion-proof valve, and thus, may be affected by some reaction with outside air.

For example, when outside air is very humid, water enters the battery from outside air such that the vapor pressure of an electrolyte in the battery is equivalent to the vapor pressure of outside air. When a long time has elapsed after the entry of water, and the volume of the entering water exceeds the volume of the internal space of the battery, the electrolyte may leak. Conversely, when carbon dioxide enters the battery from outside air, neutralization occurs between an electrolyte and carbon dioxide, and the electrolyte is deposited as solid potassium carbonate to block a break in the gasket, thereby reducing electrolyte leakage.

In view of the above, even after actuation of the explosion-proof valve, electrolyte leakage can be reduced by setting the air permeability of the electrolyte filter 9 in a fixed range.

Specifically, even after actuation of the explosion-proof valve, electrolyte leakage can be reduced by setting the Gurley number (air permeability) of the electrolyte filter 9 in a range of 100-500 seconds/100 ml. When the Gurley number is greater than or equal to 100 seconds/100 ml, this can eliminate the risk of causing electrolyte leakage due to the passage of water after a lapse of a long period from the actuation of the explosion-proof valve even with very humid outside air. When the Gurley number is equal to or less than 500 seconds/100 ml, carbon dioxide is easy to pass through the electrolyte filter 9 and enter the battery from outside air after the actuation of the explosion-proof valve, and neutralization occurs between an electrolyte in the electrolyte filter and carbon dioxide to form potassium carbonate, thereby reducing electrolyte leakage. The Gurley number of the electrolyte filter 9 is more preferably set in a range of 200-350 seconds/100 ml.

Here, the Gurley number is the air permeability (air resistance) according to a Gurley tester method specified in the Japanese Industrial Standards (JIS) P8117, and is expressed by the time (second/100 ml) required for 100 ml of air to pass through a porous member having an area of 642 $mm^2$ at temperatures of 23±1° C.

In the present invention, the material of the electrolyte filter 9 is not particularly limited; however, instead of the above-described materials, for example, nonwoven fabric of any other materials to which fine particles of polytetrafluoroethylene are adhered, or a porous material, such as a foam, can be used. Alternatively, a composite film including, e.g., nonwoven fabric or a mesh having relatively large pores and adhered or placed on such a porous membrane as described above can be used. For example, polyamide, polyethylene, polypropylene, or polyvinylidene chloride can be used as a material of the nonwoven fabric or the mesh. For example, alkali-resistant cellulose fibers, lyocell (Tencel), vinylon, or rayon can be used as a material of the nonwoven fabric.

In the present invention, the alkaline battery is not limited to a battery having such a structure as illustrated in FIG. 1, such as a cylindrical battery, and the present invention can be also practiced with rectangular batteries. Components forming an alkaline battery can be also appropriately selected based on the required specifications.

A method for fabricating each of the batteries 1-29 illustrated in Tables 1-5 described above is as follows.

(1) Fabrication of Positive Electrode

A hollow cylindrical positive electrode pellet was obtained by fully mixing manganese dioxide powder and graphite powder in a weight ratio of 93:7, mixing the mixture and an alkaline electrolyte solution containing 38 weight percent (wt. %) of a potassium hydroxide aqueous solution in a weight ratio of 100:2, and then, pressing the resultant mixture to form a granular positive electrode mixture.

(2) Fabrication of Negative Electrode

A gelled negative electrode 3 was obtained by mixing a gelling agent made of sodium polyacrylate, an alkaline electrolyte solution containing 34 wt. % of a potassium hydroxide aqueous solution, and a negative electrode active material made of zinc powder in a weight ratio of 1:33:66. In order to increase the corrosion resistance of zinc, powder of an alloy containing very small amounts of bismuth, indium, and aluminum was used as the zinc powder, and indium hydroxide and a surfactant were added into an electrolyte.

(3) Fabrication of Cylindrical Alkaline Battery

An AA alkaline battery (LR6) having the structure illustrated in FIG. 1 was fabricated using the following procedure.

Two positive electrode pellets fabricated in the above-described method were inserted into a battery case 1, and pressed with a pressing tool to bring the positive electrode pellets into close contact with an inner wall of the battery case 1 to obtain a positive electrode 2. A cylindrical separator 4 having a closed end was disposed in a central portion of the positive electrode 2, and then, an alkaline electrolyte solution containing 34 wt. % of a potassium hydroxide aqueous solution was injected into the separator 4. After a lapse of a predetermined period, the internal space of the separator 4 was filled with a gelled negative electrode 3 fabricated in the above-described method. Nonwoven fabric mainly containing vinylon fibers and rayon fibers was used as the separator 4.

A sealing unit was disposed at an opening of the battery case 1, and the opening was sealed by crimping the battery case 1. As the sealing unit, a sealing unit previously assembled by interposing an electrolyte filter 9 between a sealing plate 7 to which a negative electrode current collector 6 was welded, and a gasket 5 was used. The sealing plate 7 included two vents 7a having a diameter of ϕ1.5 mm and spaced uniformly on the circumference of a circle. The gasket 5 made of nylon included a ring-shaped thin portion 5a with a thickness of 0.2 mm.

In order to prevent the leakage of an electrolyte from the space A defined by the sealing plate 7 and the electrolyte filter 9, the contact region between the gasket 5 and the electrolyte filter 9 was sealed by coating the contact region with an alkali-resistant adhesive. When the sealing unit was assembled, the gasket was formed in a circular shape having a diameter of ϕ10.5 mm, and a small hole having the same diameter as the diameter of the negative electrode current collector was formed in the center of the circular gasket.

In order to clearly examine the advantages of the present invention, in each of the fabricated batteries, the amounts of the positive electrode, the gelled negative electrode, and the electrolyte equally increased such that the volume of the internal space of the battery, i.e., a space entered by gas except power-generating elements, such as the positive electrode, the negative electrode, the electrolyte, and the separator, was 0.15 cm$^3$.

The present invention has been described based on the foregoing preferred embodiment. This embodiment does not limit the present invention, and may be variously changed or modified. For example, in the embodiment, the thin portion 5 of the ring-shaped gasket is used as the explosion-proof valve; however, the explosion-proof valve is not limited to the thin portion 5, and any other structures may be used.

INDUSTRIAL APPLICABILITY

The present invention is useful as an alkaline battery which does not cause electrolyte leakage even with actuation of an explosion-proof valve, and offers a superior level of safety.

| DESCRIPTION OF REFERENCE CHARACTERS | |
|---|---|
| 1 | BATTERY CASE |
| 1a | POSITIVE ELECTRODE TERMINAL |
| 2 | POSITIVE ELECTRODE |
| 3 | NEGATIVE ELECTRODE |
| 4 | SEPARATOR |
| 5 | GASKET |
| 5a | THIN PORTION |
| 6 | NEGATIVE ELECTRODE CURRENT COLLECTOR |
| 7 | SEALING PLATE |
| 7a | VENT |
| 8 | EXTERIOR LABEL |
| 9 | ELECTROLYTE FILTER |

The invention claimed is:

1. An alkaline battery in which an opening of a battery case containing a power-generating element is sealed via a sealing plate with a gasket interposed between the battery case and the sealing plate, wherein
    the sealing plate has a vent,
    the gasket has an explosion-proof valve,
    an electrolyte filter made of a porous membrane is disposed in a space defined by the sealing plate and the gasket,
    a volume of a space defined by the sealing plate and the electrolyte filter is greater than or equal to 0.25 cm$^3$ and equal to or less than 0.36 cm$^3$, and
    a tensile stress of the electrolyte filter at 100% tensile elongation in at least one direction is in a range of 60-4000 N/m.

2. The alkaline battery of claim 1, wherein the tensile stress of the electrolyte filter at 100% tensile elongation in at least one direction is in a range of 60-1000 N/m.

3. The alkaline battery of claim 1, wherein the tensile stress of the electrolyte filter is a tensile stress of the electrolyte filter at 100% tensile elongation in a direction parallel to a plane of the electrolyte filter.

4. The alkaline battery of claim 1, wherein the electrolyte filter is sandwiched between an outer portion of the sealing plate and an outer portion of the gasket.

5. The alkaline battery of claim 1, wherein the porous membrane forming the electrolyte filter is made of polytetrafluoroethylene.

6. The alkaline battery of claim 1, wherein a Gurley number of the electrolyte filter is in a range of 100-500 seconds/100 ml.

7. The alkaline battery of claim 1, wherein the explosion-proof valve consists of a thin portion of the gasket.

8. The alkaline battery of claim 1, wherein the alkaline battery is an AA alkaline battery.

* * * * *